Feb. 6, 1945.  A. B. CHATELAIN  2,368,804
FADER FOR MOTION PICTURE PRINTERS
Filed March 8, 1941  3 Sheets-Sheet 1

INVENTOR
Arthur B. Chatelain
BY
ATTORNEY

Feb. 6, 1945. A. B. CHATELAIN 2,368,804
FADER FOR MOTION PICTURE PRINTERS
Filed March 8, 1941 3 Sheets-Sheet 2

INVENTOR
Arthur B. Chatelain
BY
ATTORNEY

Feb. 6, 1945. A. B. CHATELAIN 2,368,804
FADER FOR MOTION PICTURE PRINTERS
Filed March 8, 1941 3 Sheets-Sheet 3

INVENTOR
Arthur B. Chatelain
BY
ATTORNEY

Patented Feb. 6, 1945

2,368,804

UNITED STATES PATENT OFFICE 2,368,804

FADER FOR MOTION-PICTURE PRINTERS

Arthur B. Chatelain, Los Angeles, Calif., assignor to Twentieth Century-Fox Film Corporation, Los Angeles, Calif., a corporation of New York Application March 8, 1941, Serial No. 382,355

4 Claims. (Cl. 88—24)

This invention relates to the art of printing motion pictures and deals with a means for making automatic printing fades.

In printing motion pictures it is customary to utilize the fade either at the beginning or the end of the scene. When used at the beginning of a scene it is termed a "fade in" and causes the light to progressively intensify to produce an increase in the photographic densities on the film. When used at the end of a scene it is termed a "fade out" and progressively dims the printing light to produce a decrease in photographic densities. Sometimes these fades are overlapped, that is, the fade out on the end of a scene will be overlapped and printed on the fade in at the beginning of a scene. In motion picture parlance this would be termed a lap dissolve. The present day practice of making fades consists in effecting a change in the printing light intensity by hand manipulated means. This practice results in irregular changes extending over approximate distances only. There can be nothing accurate in regulating a light by hand over any known length of film, since there is no way of synchronizing the change of light with the speed of the film except by guess work.

The invention to be described and claimed hereinafter provides a means whereby the intensity of the printing light may be changed and controlled by the movement of the film. The means for this purpose has been adapted and arranged to be mounted on a conventional printer of a well known type, and by minor alterations may be interposed between the printing light and the printing gate. The device when installed in this manner is adapted to be connected to a driving member of the printer by suitable disengageable means, and when so connected will operate to progressively vary the intensity of the light reaching the film in timed relation to the speed of the film. Means are also provided for operating the device from the conventional contactor on the machine, which is actuated by the usual notch in the film. In addition, the apparatus is equipped with means for varying the rate of change of the printing light with respect to the film travel. This is for the purpose of providing various length fades and is especially useful for forming lap dissolves wherein the fade out and the fade in portions must be of complementary densities and the faded portions must be of the same length.

It therefore becomes the purpose of this invention to provide an automatic printing fader whereby the length of the fade may be accurately controlled. Another object is to provide a device of the character described wherein fades of various predetermined lengths may be made. Another object is to provide an automatic fader wherein the rate of change of the printing light intensity is controlled by the film travel. Still another object is to provide a fader which may be installed upon a conventional printing machine and driven by the mechanism of the machine itself. Other objects and advantages will become apparent as the description proceeds in conjunction with the drawings in which:

Briefly stated, the invention amounts to a means that may be incorporated into a conventional motion picture film printer of a well known type with minor alterations and may be driven by the machine mechanism to produce fades or, as hereinbefore and hereafter termed, fade ins and fade outs of various predetermined lengths. In its preferred form the invention has been assembled and mounted upon a unit member which will be termed a plate generally designated P that is adapted to be inserted between the printing light and the printing aperture. Upon this plate I mount the various mechanisms required to perform the functions stated hereinbefore.

Figure 1:
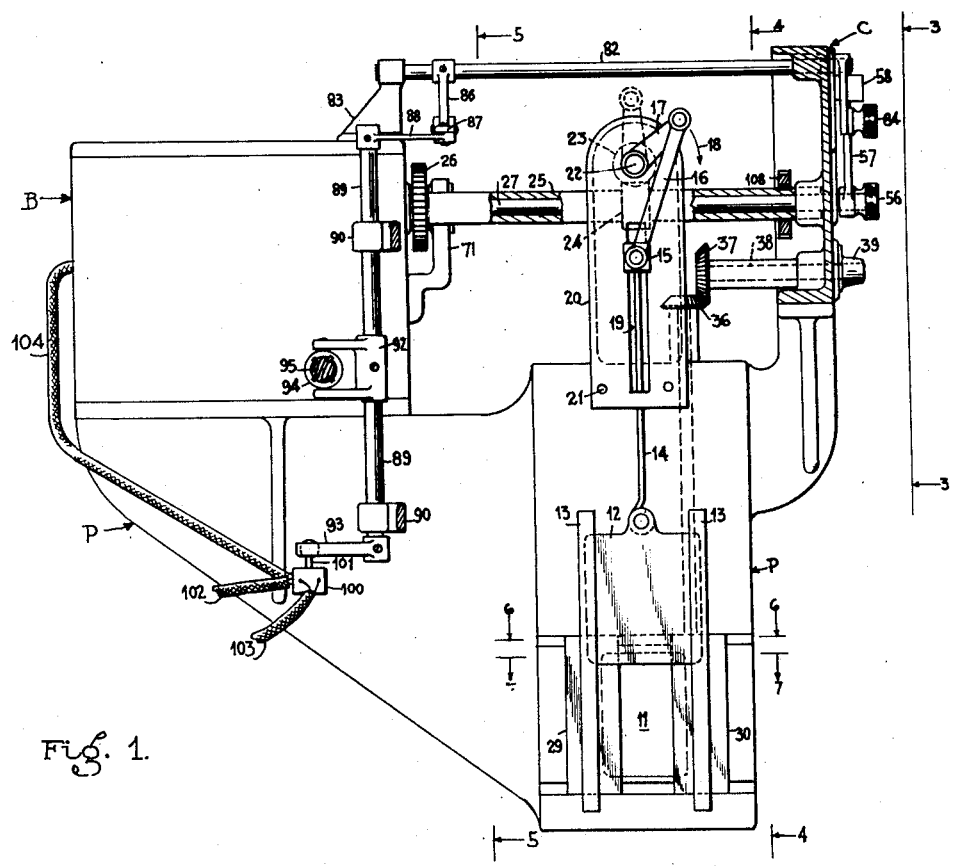
Figure 1 is a view partly in section showing the device assembled for installation upon a printing machine.

Referring to Figure 1, the mechanism mounted upon the plate P may be seen to comprise a box generally designated B which contains a variable speed mechanism and a control head generally designated C, together with attendant mechanism for correlating the whole into an operable unit.

Figure 7:
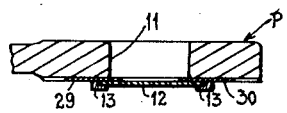
Figure 7 is a view taken on line 7—7 of Figure 1.

The function of the entire device is to progressively dim or progressively intensify the printing light falling upon the printing aperture. I accomplish this by shuttering the effective printing light between the printing lamp and the printing aperture. The shutter for this purpose is mounted upon the plate P in the following manner. In Figures 1 and 7 it will be observed that the plate P is formed with an aperture 11 adapted to pass light from the regular printing lamp in a manner to be later described. Over the aperture 11, I slidably mount a shutter 12 arranged to reciprocate in runners 13, which in turn are mounted upon the plate P. The shutter 12 is reciprocated by means of a rod 14 which is attached to a sliding carriage 15 that in turn is reciprocated by means of a link 16 connected to a crank 17. It can be seen from the foregoing structure that, as the crank 17 is rotated in the direction of the arrow 18, the shutter 12 slides downwardly over the aperture 11 and entirely closes the aperture. As the shutter closes the aperture in this manner, the printing light is progressively dimmed and forms on the film what is generally termed a fade out. It is evident that if the shutter started from the bottom, or the closed position over the aperture, the light would be progressively increased or intensified and would form on the film what in motion picture parlance is generally termed a fade in. The carriage 15 is arranged to work in a slot 19 formed in a member 20 which is suitably mounted upon the plate P by bolts or screws such as 21. The crank arm 17 in turn is mounted upon a shaft 22 which is supported in the member 20 and carries on its opposite end a gear 23 which meshes with a gear 24 fixed to a shaft 25. The shaft 25 as shown is rotatably supported in the member C and the box B and carries another gear 26 fixed thereon. As shown, the shaft 25 is hollow and carries a rod 27 rotatably mounted therein. The gear 26 meshes with a gear 28 suitably mounted externally of the box B and driven from mechanism in the box to be later described.

Figure 6:
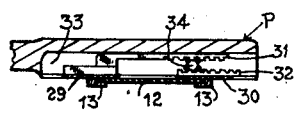
Figure 6 is a sectional view taken on line 6—6 of Figure 1.

Referring again to the aperture 11, it will be noted that there is a pair of plates 29 and 30 arranged to be slid laterally for opening and closing the aperture horizontally. This opening and closing action will be observed to be at right angles to the opening and closing action of the shutter 12 and the purpose is to regulate the fixed intensity of the printing light before the shutter 12 operates to progressively cut off or increase the printing light. The plates 29 and 30, as before stated, are adapted to be moved laterally with respect to each other and the means for this purpose can best be seen in Figure 6. Here it is shown that the plates 29 and 30 have attached to them racks 31 and 32 respectively, said racks working in a slot 33 in the plate P. Between the racks I provide a pinion 34 on the end of a shaft 35 adapted to engage the racks on opposite sides of the pinion. Under this arrangement the plates 29 and 30 may be moved either to open or close the aperture 11 by turning the shaft 35. As will be noted, the shaft 35 extends through the plate P and carries on its upper end a miter gear 36 which meshes with another gear 37 that is mounted upon a shaft 38, which in turn is rotatably mounted in the control plate C and carries a control knob 39 on its outer end. From the foregoing, it is obvious that the aperture 11 may be opened and closed laterally by turning the knob 39. Means are carried upon the control plate C for indicating the extent of the opening and may take the form of a dial 40 having suitable calibrations thereon.

Figure 8:
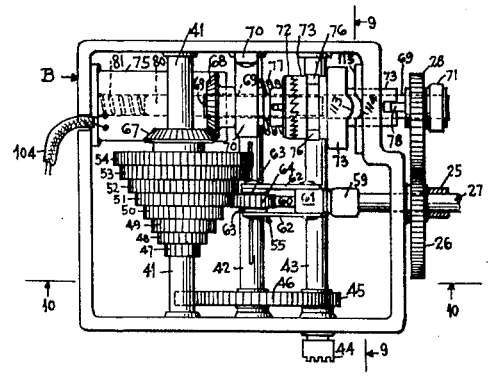
Figure 8 is a view taken on line 8—8 of Figure 5, showing the interior of the variable speed transmission device.
Figure 9:
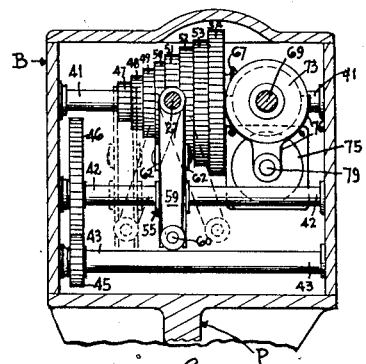
Figure 9 is a view taken on line 9—9 of Figure 8.
Figure 10:
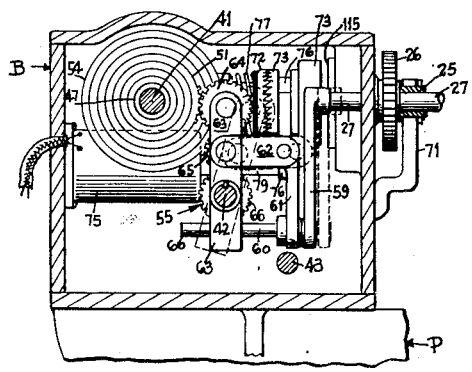
Figure 10 is a view taken on line 10—10 of Figure 8.

Having shown the shutter construction and the functions thereof, it remains to show means for driving the shutter in the manner stated; that is, by variable preselected speeds controlled by the film movement. The means for varying the speed of the shutter 12 is contained in the box B, which is best seen in Figures 8, 9, and 10. In Figure 8 it will be observed there are three shafts, namely, 41, 42, and 43, mounted in the box B. The shaft 43 extends externally of the box and carries a clutch member 44, the purpose of which will be later described. Inside the box B, I mount a gear 45 on the shaft 43 which meshes with a gear 46 on the shaft 42. The shaft 43 therefore becomes the driver with respect to the box B, while the shaft 42 may be termed the intermediate shaft and the shaft 41 may be termed the driven shaft through gears to be now described. Upon the shaft 41, I mount a series of gears 47 to 54 inclusive. These gears will be noted to vary from a small diameter gear 47 to a large diameter gear 54. As a means of translating variable speeds through the box B, I mount a sliding gear arrangement generally designated 55 upon the shaft 42 and control this arrangement by means of the rod 27 which, as before explained, extends through the shaft 25 to the control plate C, where it is equipped with a manual control knob 56 having a finger 57 that extends to and contacts a stepped plate 58. The purpose of this stepped plate will become apparent in explaining the use of the variable speed arrangement. As can be seen by referring to Figures 9 and 10, the rod 27 carries a crank arm 59 inside the box B which at its lower end carries a pin 60. On the pin 60 there is another upstanding arm 61 which is pivotally mounted on the pin. On the upper end of the arm 61, I provide cross links 62 which extend over and engage plates 63 that carry meshed gears 64, 65, and 66 pivotally mounted therebetween. The gear 66 is splined to the shaft 42 so that it may be slid longitudinally along the shaft. As will be noted, the plates 63 extend below the shaft 42 on opposite sides of the pin 60, thereby forming a means of shifting the whole assembly 55 along the shaft 42 by first pulling on the rod 27 to swing the assembly 55 free of contact with any of the gears 47 to 54, and then rotating the rod 27, which in turn throws the crank arm 59 to any one of the dotted positions shown in Figure 9 and slides the assembly 55 in position selected. The gear 64 then may be meshed with any one of the gears 47 to 54, depending upon the position of the crank arm 59, by pushing the rod 27 inwardly, thereby rocking the arms 63 on the shaft 42 until the gear 64 meshes with the selected gear. In this way any one of the gears 47 to 54 may be selected and, since the gears 47 to 54 are variable in diameter, the shaft 41 may be driven at a predetermined variable speed. On the shaft 41, I also mount a miter gear 67 arranged to engage another miter gear 68, which in turn is mounted upon a shaft 69 that may be rotatably supported in a bearing 70 internally of the case of the box B and supported at the other end in a bracket 71. It is to be understood that the gear 28 which meshes with the gear 26 is not attached to the shaft 69 except by the means to be hereinafter described. The means for intermittently driving the gear 28 by the shaft 69 comprises a clutch consisting of ratchet members 72 and 73. The member 72 is fixed to rotate with the shaft 69 through a pin and slot connection 74 while the member 73 is rotatably mounted on the shaft 69 and is adapted to be moved into engagement with the ratchet member 72 by means of a solenoid 75 arranged to pull the member 73 along the shaft 69 by means of a fork 76 working in a circular groove 76' in the member 73. The fork 76 is attached to a movable rod 79 which is connected to or is a part of the core 80 and the solenoid 75. A spring 81 holds the core and the rod 79 normally extended so that the clutch members 72 and 73 are engaged only when the solenoid is energized. A spring 77 may be mounted between member 72 and the bearing 70 to cushion the effect of the solenoid in suddenly contacting the members 72 and 73. The member 73 is arranged to drive the gear 28 through a tongue and slot connection generally designated 78. From the above described arrangement it can be seen that the gear 28 is only driven when the solenoid 75 is energized.

Figure 2:
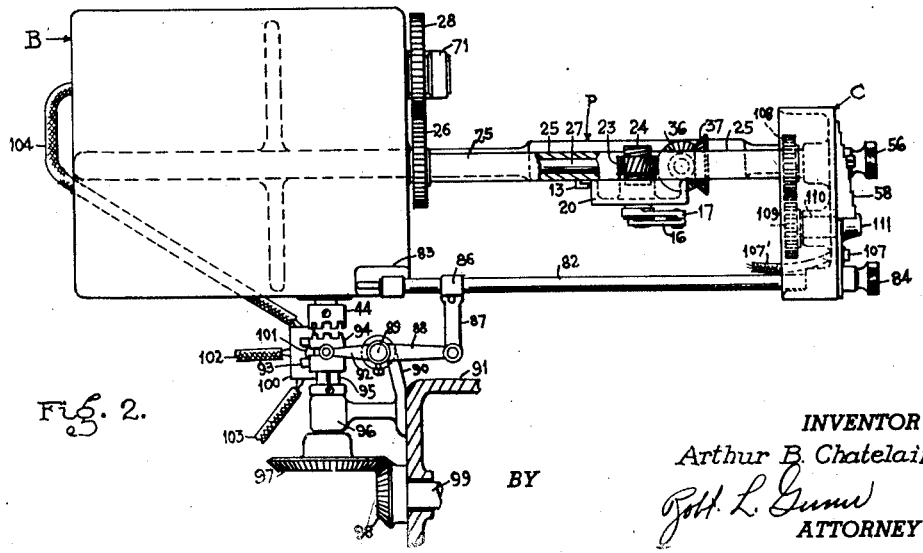
Figure 2 is a top plan view of Figure 1, showing a fragmentary part of the printing machine itself.
Figures 4, 5:
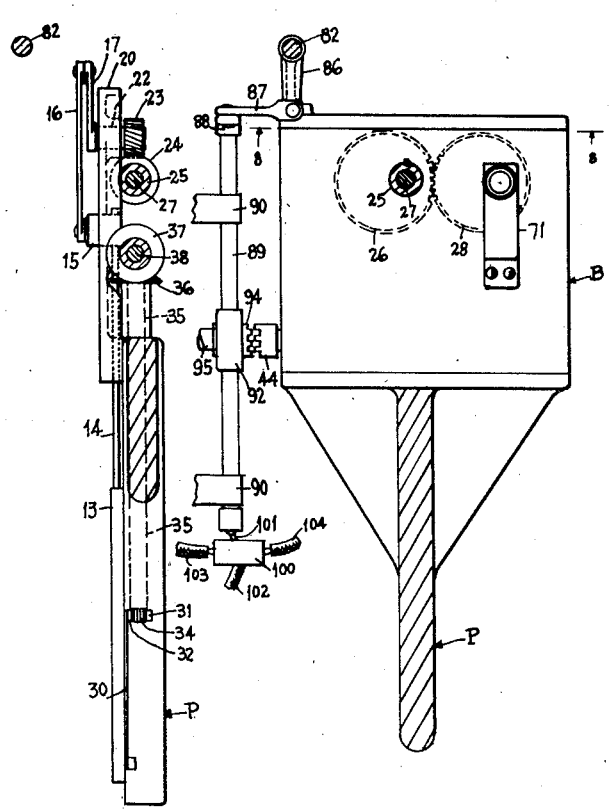
Figure 4 is a view taken on line 4—4 of Figure 1.
Figure 5 is a view taken on line 5—5 of Figure 1.

The means for energizing the solenoid utilizes part of the already existing equipment on the printer. To those versed in the art of motion picture printers, it is known that an electrical contactor or an interrupter is installed on the printing machine, which under the present practice is utilized to control a solenoid for regulating the fixed intensity of the printing lamp. In my invention I utilize this same contactor by switching the output of the contactor from the conventional solenoid above mentioned to the solenoid 75 in the box B of my equipment. Also, since it is the intention of incorporating my invention on a standard motion picture printer, I provide means for engaging or disengaging my fading apparatus with a driving member on the printing machine. These means will be best seen in Figures 1, 2, and 5. In these figures it will be observed that I have provided a rod 82 extending from the control plate C to a bracket 83 on the box B. The rod 82 is equipped on the control end with a handle 84 which operates over a plate 85 that may have indicia as shown signifying the position of the operating means. On the rod 82 I affix a crank 86. The crank 86 in turn pivotally engages a link 87, which link in turn pivotally engages another crank 88 attached to a vertical rod 89. The rod 89 may be rotatably supported in brackets 90 suitably mounted upon a part of the housing 91 of the printer. Affixed to the rod 89 is a yoke member 92 and a crank member 93 which are for the purpose respectively of engaging or disengaging power to the box B and of switching the output of the contactor from the conventional solenoid or electrical means for controlling the fixed intensity of the light in the ordinary manner to the solenoid 75 in box B. As best seen in Figure 2, the yoke 92 extends over and engages a sliding clutch member 94 which is splined to a shaft 95. The clutch member 94 is adapted to be moved into engagement with the hereinbefore described member 44 and effect a driving connection between the shaft 95 and the shaft 43. The shaft 95 may be mounted in a bearing 96 suitably mounted upon the housing 91. The means for driving the shaft 95 comprises miter gears 97 and 98, the gear 98 being mounted upon a shaft 99 which in turn is synchronously driven by the same mechanism that feeds the film through the printing machine. From the foregoing it can be seen that the shaft 43 in the box B is synchronously driven with respect to the speed of the film as it travels through the printing machine when the clutch members 94 and 44 are in engagement.

Figure 12:
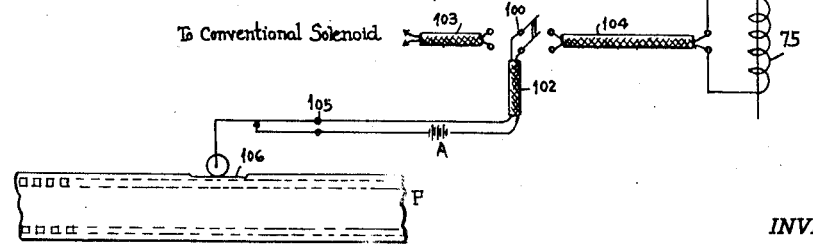
Figure 12 is a schematic view showing the electrical wiring and switching arrangement employed in operating my device.

Referring to the crank 93, it will be noted that this crank is arranged to operate a switch box 100. For purposes of illustration this switch will be termed a double pole, double throw switch, but any other switch which will perform the function may be used. As shown here, the switch box 100 has an extending finger 101 which is engaged by the crank arm 93 in any suitable manner such as by a slot or ball and socket arrangement. The switch has three leads, namely, 102, 103, and 104. Lead 102 leads to the contactor 105 before mentioned and connects the output of the contactor to the midtaps of the switch. The lead 103 leads from the switch to the conventional solenoid which is used to regulate the fixed light intensity passing through the printing aperture. Lead 104 leads from the switch box to the solenoid 75 in my box B. The clutch members 94 and 44 and the switch 100 are so arranged that when the clutch is engaged the switch connects the output of the contactor to the solenoid 75 in my apparatus and when the clutch is disengaged, as shown in Figure 2, the output of the contactor is connected to the standard solenoid used for controlling the fixed light intensity in the conventional manner. This is best illustrated in Figure 12, wherein I have diagrammatically shown the contactor 105 working in a notch 106 in the side of a film F in the conventional manner. The contactor completes the circuit through a battery A to the swinger of the switch 100. When the clutch members 94 and 44 are engaged, the switch 100 is thrown so that the output of the contactor is fed into the solenoid 75 and when the clutch is disengaged the output is fed onto the other side of the switch or to the conventional solenoid. In order to skip certain notches in the film which are not wanted, I provide a switch 107 between the switch 100 and the solenoid 75. For convenience this switch is located on the control plate C and a suitable lead 107' may be run in any convenient manner from the solenoid to the switch.

As stated in the forepart of this specification, my apparatus has been designed to produce either a fade in or a fade out. This means that the shutter 12 must be able to start from either a closed position or an open position. In order to do this it is necessary to provide means for changing the position of the shutter with respect to the driving mechanism. For this purpose I provide a gear 108 affixed to the shaft 25 near the control plate C. The gear 108 meshes with another gear 109 which is mounted on a stub shaft 110 that in turn is rotatably mounted in the plate C and controlled by a knob 111. By turning the knob 111 the shaft 25 may be rotated even though the clutch members 72 and 73 are engaged to change the position of the shutter 12. In this manner the shutter may be set to produce either a fade in or a fade out.

Figure 3:
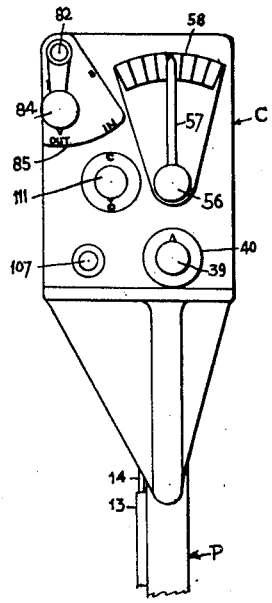
Figure 3 is a fragmentary view of Figure 1 taken on line 3—3.

In operating the machine it is to be understood that the printer may be used in the ordinary manner to print motion picture film or that by means of my apparatus it may be converted into a machine for producing fades either at the beginning or the end of a scene. If the machine is working in the conventional manner, the clutch members 94 and 44 are disengaged, which means that the switch 100 is switching the functions of the contactor to the conventional solenoid for controlling the fixed intensity of the light for printing the different scenes. If the machine is to be used for producing fades, the lever 84 is swung from the full line or the "out" position in Figure 3 over to the "in" position. This connects the clutch members 94 and 44 and switches the output of the contactor to the solenoid 75 and the gears in the box B start turning. Then the length of the dissolve to be made is determined and any gear, ranging from 47 to 54, is selected which will give the proper length. To do this, the knob 56 is pulled back from the control plate C and turned until the proper gear ratio is indicated upon the dial 58, whereupon the knob is pushed inwardly until the gear 64 of the sliding gear assembly 55 is pushed into contact with the gear selected, which as shown in this case would be gear 51. This selection of gears would give a fixed speed to the rotation of the shaft 41, which in turn through the gears 67 and 68 would continuously rotate the shaft 69. From this arrangement it is obvious that the shaft 69 is rotated at a speed proportional to the speed of the film movement through the machine. As soon as the contactor 105 detects a notch 106 in the film, the solenoid 75 is energized, which pulls the member 73 into engagement with the member 72, that in turn rotates the gear 28 by the aforementioned tongue and slot connection 78. The gear 28 in turn rotates the gear 26. Attention is called to the eccentricity of the gears 26 and 28. By referring to Figure 5, it can be seen that these gears are eccentrically mounted upon their shafts, which is for the purpose of providing a progressively varying rate of change in density required to produce a smooth fade. In practice it has been found that the rate of change of the light intensity must vary proportionally to the intrinsic value of the effective light to produce a smooth fade out, and that the rate of change must vary inversely to the intrinsic value of the effective light to produce a smooth fade in. The rotation of the gear 26 drives the shaft 25, which in turn through the gears 23 and 24 rotates the arm 17 that controls the shutter 12. The cycle of the operation for a fade out is one-half of a complete rotation of the arm 17 and the starting position would be the dotted line position of the arm 17 in Figure 1. In order to confine the operation to one-half of a revolution, the member 73 (Figure 8) is provided with a protuberance 113 which is adapted to fit into an indentation 114 formed in a part of the case of the box B. It is to be understood that there are two protuberances and two indentations spaced 180° apart, which will give a complete cycle of operation of one-half of a revolution of the member 73. It can be seen therefore that as the member 73 is moved toward the member 72 the protuberance 113 is withdrawn from the indentation 114 and as the member 73 starts to revolve the protuberance 113 rides upon the face 115 and holds the two members in engagement during one-half of a revolution only. As the member 73 rotates for one-half of a revolution, the protuberance 113 slides into the other indentation spaced 180° from the indentation 114 and allows the member 73 to move away from the other clutch member, thus disengaging the clutch members 72 and 73 and completing one cycle. During this cycle the shutter 12 has moved downwardly over the aperture 11 and has progressively cut the light to extinction that passes to the film. In case it was desired to progressively increase the light instead of decreasing it, the knob 111 would be turned from the open position, indicated by the letter "O" as shown in Figure 3, to the closed position indicated by the letter "C." This would rotate the shaft 25 through the gears 108 and 109 until the arm 17, instead of pointing upwardly, would point downwardly. From this position the shutter would start from a closed position and would progressively open the aperture 11.

Figure 11:
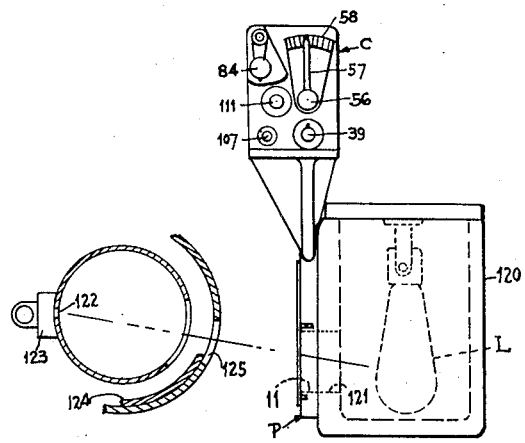
Figure 11 is a schematic view showing the position of my automatic fader as it would be installed upon a printer between the printing light and the printer gate.

In Figure 11, I have shown the effect of the movement of the shutter 12. Here it will be observed that the plate P is mounted upon the standard lamp housing 120. Inside the housing 120 there is the usual printing lamp L. Also, the housing is provided with an aperture 121 which registers with the aperture 11 in the plate P. Light from the lamp L passes through these apertures to a printing aperture 122, which is covered by the usual printing gate 123. The ordinary method of controlling the fixed intensity of the printing light consists in moving the shutter 124 over an aperture 125. This shutter is controlled by the conventional solenoid hereinbefore mentioned. From this set-up it will be observed that the shutter 12 which works over the aperture 11 controls the light in addition to the shutter 124. As stated hereinbefore, the shutter 124 is the conventional shutter on the standard printing machine and is not to be confused with my shutter 12. The function and the operation of the two shutters is distinct. The function of the shutter 124 is to fix the light intensity for printing separate scenes, while the function of my shutter is to vary the light to form a variation in photographic densities either at the end or the beginning of a scene.

Having shown and described a preferred form of my invention, I intend this disclosure to cover all equivalent means, including modifications and refinements, that come within the scope of the disclosure and the purview of the appended claims.

I claim:

1. In a motion picture printer, a combination of two shutters between the printing light and the printing aperture, one of said shutters comprising a pair of opaque plates, means for simultaneously moving said plates to control the opening therebetween, the other of said shutters consisting of an opaque plate, means for moving said plate substantially at a right angle to the movement of said first mentioned plates over the opening between said plates to shutter the same; said last mentioned means including a crank arm and a link connecting said crank arm to said plate, drive means for rotating said crank arm, and means for automatically engaging or disengaging said drive means from said crank arm to rotate the same one-half of a revolution only to move said plate from a non-shuttering position to a shuttering position over said opening.

2. In a motion picture printer, a combination of two shutters between the printing light and the printing aperture, one of said shutters comprising a pair of opaque plates, means for simultaneously moving said plates to control the opening therebetween, the other of said shutters consisting of an opaque plate, means for moving said plate substantially at a right angle to the movement of said first mentioned plates over the opening between said plates to shutter the same, said last mentioned means including a crank arm and a link connecting said crank arm to said plate, and drive means for rotating said crank arm to move said plate from a non-shuttering position to a shuttering position over said opening, said drive means including a pair of eccentrically mounted meshed gears adapted to yield a varying rate of movement to said crank arm.

3. In a motion picture printer, a combination of two shutters between the printing light and the printing aperture, one of said shutters comprising a pair of opaque plates, means for simultaneously moving said plates to control the opening therebetween, the other of said shutters consisting of an opaque plate, means for moving said plate substantially at a right angle to the movement of said first mentioned plates over the opening between said plates to shutter the same, said last mentioned means including a crank arm and a link connecting said crank arm to said plate, and drive means for rotating said crank arm to move said plate from a non-shuttering position to a completely shuttering position over said opening, said drive means including a pair of eccentrically mounted meshed gears adapted to yield a changing rate of movement to said crank arm during the movement of said plate over said opening.

4. In combination in a motion picture printer, means for shuttering the effective printing light in said printer, means for driving said shuttering means from the film moving means in said printer, said driving means including a pair of eccentrically mounted meshed gears adapted to change the speed of said shuttering means during the operating time thereof.

ARTHUR B. CHATELAIN,